United States Patent [19]
Sinquin et al.

[11] Patent Number: 6,093,862
[45] Date of Patent: Jul. 25, 2000

[54] PROCESS FOR SLOWING THE GROWTH AND/OR AGGLOMERATION AND POSSIBLY RETARDING THE FORMATION OF HYDRATES IN A PRODUCTION EFFLUENT

[75] Inventors: Anne Sinquin, Nanterre; Marie Velly, Montesson; Patrick Gateau, Maurepas; Jean-Pierre Durand, Chatou, all of France

[73] Assignee: Institut Francais du Petrole, France

[21] Appl. No.: 09/129,388

[22] Filed: Aug. 5, 1998

[30] Foreign Application Priority Data

Aug. 5, 1997 [FR] France .................................. 97 10.118
Aug. 5, 1997 [FR] France .................................. 97 10.119

[51] Int. Cl.[7] .................................. C07C 7/20; F17D 1/05
[52] U.S. Cl. .............................. 585/15; 585/950; 95/153; 137/13; 166/310
[58] Field of Search ........................ 585/15, 950; 95/153; 137/13; 166/310

[56] References Cited

U.S. PATENT DOCUMENTS

| | | | |
|---|---|---|---|
| 4,915,176 | 4/1990 | Sugier et al. | 166/371 |
| 4,973,775 | 11/1990 | Sugier et al. | 585/15 |
| 5,244,878 | 9/1993 | Sugier et al. | 507/90 |
| 5,426,258 | 6/1995 | Thomas et al. | 585/15 |
| 5,434,323 | 7/1995 | Durand et al. | 585/15 |
| 5,741,758 | 4/1998 | Pakulski | 507/90 |
| 5,817,898 | 10/1998 | Delion et al. | 585/15 |

FOREIGN PATENT DOCUMENTS

| | | |
|---|---|---|
| 2197005 | 8/1997 | Canada . |
| 0 323 307 | 7/1989 | European Pat. Off. . |
| 0 323 774 | 7/1989 | European Pat. Off. . |
| 0 323 775 | 7/1989 | European Pat. Off. . |
| 0 582 507 | 2/1994 | European Pat. Off. . |
| 0 594 479 | 4/1994 | European Pat. Off. . |
| 0 740 048 | 10/1996 | European Pat. Off. . |
| 2 744 460 | 8/1997 | France . |
| 2 748 773 | 11/1997 | France . |
| 2 749 774 | 12/1997 | France . |
| 95/19408 | 7/1995 | WIPO . |
| 96/29501 | 9/1996 | WIPO . |
| 96/29502 | 9/1996 | WIPO . |
| 97/13824 | 4/1997 | WIPO . |

OTHER PUBLICATIONS

Derwent Abstract, Section Ch, Week 8845: XP002063585 & SU 1 391 629 A.

Primary Examiner—Walter D. Griffin
Attorney, Agent, or Firm—Millen, White, Zelano & Branigan, P.C.

[57] ABSTRACT

A process for slowing the growth and/or agglomeration of hydrates in a fluid comprising water and gases by adding at least one essentially water-soluble polyoxyalkylene glycol macromer or at least one essentially water-soluble polymer containing a single macromer or a plurality of different macromer units of polyoxyalkylene glycol or a mixture of essentially water-soluble macromers and/or polymacromers. It is also possible to both retard the formation of hydrates and to substantially slow their growth and limit their agglomeration during crystallization by combining polyoxyalkylene glycol macromer type structures with kinetic additive type structures which are known to inhibit hydrate formation.

28 Claims, No Drawings

PROCESS FOR SLOWING THE GROWTH AND/OR AGGLOMERATION AND POSSIBLY RETARDING THE FORMATION OF HYDRATES IN A PRODUCTION EFFLUENT

SUMMARY OF THE INVENTION

The invention relates to a process for inhibiting or retarding the formation, growth and/or agglomeration of hydrates of natural -as, oilwell gas or other gases, using at least one additive. Gases which form hydrates can comprise at least one hydrocarbon selected from methane, ethane, ethylene, propane, propene, n-butane and iso-butane, and possibly $H_2S$ and/or $CO_2$.

Such hydrates form when water is found in the presence of gas, either in a free state or dissolved in a liquid phase such as a liquid hydrocarbon, and when the temperature reached by the mixture, in particular water, gas and possibly liquid hydrocarbons such as oil, drops below the thermodynamic hydrate formation temperature, that temperature being given for a known composition of gases at a fixed pressure.

Hydrate formation is feared in particular in the gas and oilwell industry where the hydrate formation conditions can be satisfied. In order to reduce the production costs of crude oil and gas, both as regards investment and exploitation, one route, particularly for offshore production, is to reduce or even do away with treatments carried out on the crude or to the gas to be transported from the field to the coast and in particular to leave all or part of the water in the fluid to be transported. Offshore treatments are generally carried out on a platform located on the surface near the field, such that the effluent, which is initially hot, can be treated before the thermodynamic hydrate formation conditions are satisfied when seawater cools the effluent.

However in practice, when the thermodynamic conditions required for hydrate formation are satisfied, hydrate agglomeration causes the transport conduits to block by the formation of plugs which prevent the passage of any crude oil or gas.

Hydrate plug formation can cause a production stoppage and thus result in substantial financial losses. Further, restarting the installation, especially when it involves offshore production or transport, can be a long process, as it is difficult to decompose the hydrates which have formed. When the production from an undersea natural gas or crude oil and gas field comprising water reaches the surface of the sea bed and is then transported along the sea bottom, the reduction in the temperature of the effluent produced can mean that the thermodynamic conditions for hydrates to form are satisfied and they form, agglomerate and block the transfer conduits. The sea bottom temperature can, for example, be 30° C. or 4° C.

Favourable conditions for hydrate formation can also be satisfied onshore when conduits are not buried (or are not buried deeply) in the soil, for example when the ambient air temperature is low.

In order to overcome these disadvantages, prior authors have sought products which when added to a fluid can act as inhibitors by reducing the thermodynamic hydrate formation temperature. They are mainly alcohols, such as methanol, or glycols such as mono-, di- or tri-ethylene glycol. This solution is very expensive as the quantity of inhibitors which have to be added can be as high as 10% to 40% of the amount of water and the inhibitors are difficult to recover completely.

Insulation of the transport conduits has also been recommended, to prevent the temperature of the transported fluid from reaching the hydrate formation temperature under the operating conditions. However, this technique is also very expensive.

The use of additives which can modify the hydrate formation mechanism have also been described where, instead of rapidly agglomerating together to form plugs, the hydrates formed disperse in the fluid without agglomerating and without obstructing the conduits. Examples in this regard are the applicant's European patent application EP-A-0 323 774 which describes the use of non-ionic amphiphilic compounds selected from esters of polyols and carboxylic acids, which may or may not be substituted, and compounds containing an imnide function; the applicant's European patent application 323 775, which describes the use of compounds of the family of fatty acid diethanolarnides or fatty acid derivatives; United States patent U.S. Pat. No. 4,856,593 which describes the use of surfactants such as organic phosphonates, phosphate esters, phosphonic acids, their salts and their esters, inorganic polyphosphates and their esters, and homopolyacrylamides and acrylamide-acrylate copolymers; and European patent application EP-A-0 457 375, which describes the use of anionic surfactants such as alkylarylsulphonic acids and their alkali metal salts.

Amphiphilic compounds obtained by reacting at least one succinic derivative selected from the group formed by polyalkenylsuccinic anhydrides and acids with at least one polyethylene glycol monoether have also been proposed for reducing the tendency of hydrates of natural gas, oilwell gas or other gases to agglomerate (EP-A-0 582 507).

Further, the use of additives which can inhibit or retard the formation and/or growth of hydrates has been recommended. 536 950 describes the use of tyrosine derivatives; International patent application WO A 93 25798 describes the use of homopolymer and copolymers of N-vinyl-2-pyrrolidone and mixtures thereof; and WO A 94 12761 and U.S. Pat. No. 5,432,292 describe the use of poly(N-vinyl-2-pyrrolidone), hydroxyethyl cellulose and mixtures thereof or a terpolymer based on N-vinyl-2-pyrrolidone, N-vinyl-ϵ-caprolactame and dimethylaminoethyl methacrylate, sold under the trade name GAFFIX VC-713. International patent application WO A-95 19408 more generally describes the use of aliphatic polymers containing carbonylated N-heterocycles in complex formulations. Similarly, WO A-95 32356 describes the use of a terpolymer based on N-vinyl-2-pyrrolidone, acrylamido methyl propane sulphonate and acrylamide. Finally, WO A-95 17579 and WO A-96 04462 describe the use of alkylated ammonium, sulphonium and phosphonium derivatives, used alone or mixed with a corrosion inhibitor.

We have now discovered that certain essentially water-soluble compounds based on polyoxyalkylene glycol macromers, polymerized or otherwise, can retard the growth and/or agglomeration of natural gas, oilwell gas or other gas hydrates, at low concentrations and with a very high efficiency. These compounds also optionally have a hydrate formation inhibiting effect.

The term "macromer" will hereinafter be used to designate both the polymerizable compound containing in its molecule a sequence of at least 2 alkylene oxide moieties, and the unit forming part of the constitution of the polymers (homopolymers or copolymers).

Thus in a first implementation, the invention provides a process for slowing the growth and/or agglomeration and optionally for retarding the formation of hydrates in a fluid comprising water and a gas, under conditions in which hydrates can form (from the water and gas), characterized in that at least one essentially water-soluble polyoxyalkylene glycol macromer and/or at least one polymer formed from one or more polyoxyalkylene glycol macromers is incorporated into said fluid.

The polyoxyalkylene glycol macromers are defined by the following general formula (A):

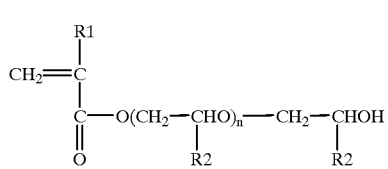

where R1 represents a hydrogen or an alkyl group containing 1 to 6 carbon atoms, preferably 1 to 4 carbon atoms; R2 represents a hydrogen atom or an alkyl group; n represents the degree of polymerization and has a value in the range 1 to 140, preferably in the range 3 to 140.

The macromers defined by general formula (A), which are essentially water-soluble and contain at least one polyoxyalkylene glycol sequence, can be used either in the form of simple compounds or in the form of polymers.

The polymers are either homopolymers, i.e., sequences of a single macromer moiety, or copolymers, i.e., polymers constituted by at least two different units defined by formula (A). These copolymers are polymacromers composed of at least two macromers which differ in their side groups R2 bonded to the oxyalkylene groups, and/or by groups R1 bonded to the macromolecular backbone and/or by the number of sequences n of ($CH_2$—$CHOR_2$) groups present in the macromer.

The macromers and polymers described in the invention have mass average molecular masses of 160 $g.mol^{-1}$ to several millions, depending on the number n of alkylene oxide moieties in the macromer and depending on the number of macromer units in the homo or copolymers. Preferred mass average molecular masses are 250 to several million.

In the process of the invention the macromers, homo and copolymers such as those described above can be added to the fluid to be treated alone or in the form of mixtures of two or more thereof. When several macromers, homopolymers or copolymers are used mixed together, they may be macromers, homopolymers of copolymers which differ, for example, in the nature of the moieties from which they are composed and/or in their molecular mass.

The macromers, homo or copolymers, and their mixtures in all proportions can be added to the fluid to be treated in concentrations which are generally from 0.05% to 5% by weight, preferably 0.1% to 2% by weight, with respect to the water present in the fluid to be treated.

The macromers, homo or copolymers recommended as additives of the invention can be mixed with one or more alcohols (monoalcohols or polyols) containing to 6 carbon atoms, for example, more particularly mono-, di- or tri-ethylene glycol, ethanol or methanol, the latter being the preferred alcohol. This alcohol (or these alcohols) is (are) in general added in proportions of 0.5% to 20% by weight, preferably 1% to 10% by weight, with respect to the water present in the fluid to be treated. The macromer(s), homopolymer(s) or copolymer(s) considered in the invention can thus first be dissolved in a hydro-alcoholic medium and then added to the medium to be treated, to obtain final concentrations of macromer(s), homopolymer(s) or copolymer(s) generally of 0.05% to 5% by weight, preferably 0.1% to 2% by weight, with respect to the water present in the fluid to be treated.

The presence in the medium of additive(s) which retard the growth and/or agglomeration and optionally have an inhibiting effect on formation, such as the macromer(s), homopolymer(s) or copolymer(s), or mixtures of these compounds recommended in the invention, and alcohol(s) such as methanol can, by their combined action, retard hydrate growth and substantially slow the formation of a plug in the conduits and also reduce the quantities of additives used (alcohol and polymers) and enable a much lower temperature range to be employed.

The essentially water-soluble macromers, homopolymers or copolymers of the invention can be used either in pure water, for example in water of condensation, or in a saline medium, for example in production water, seawater or brine.

We have also discovered that a combination of essentially water-soluble compounds based on polyoxyalkylene glycol macromers as described above, which slow hydrate growth and/or agglomeration, with kinetic inhibitor compounds known essentially to retard hydrate formation, is highly effective in modifying the hydrate formation mechanism while limiting the rate at which the hydrates form and their tendency to agglomeration. These compounds (or these mixtures of compounds) comprising the two types of structures can be used at low concentrations. The process is applicable to hydrates of natural gas, oilwell gas or other gases, with very high efficiency.

This modification of the crystal formation, growth and/or agglomeration mechanism can be used to advantage when transporting fluids comprising a gas which is prone to forming hydrates, and water. It can also be used in oil or water based drilling mud to avoid the problems due to hydrates encountered during drilling operations.

When the process is applied to the transport of fluids in a conduit, i.e., to the transport of gas and water, possibly in the presence of a condensate type or oil type liquid hydrocarbon phase, the additive or additive mixture can be injected continuously or in batch form into the conduit upstream of the portion of the conduit where the thermodynamic conditions for hydrate formation are satisfied. Adding the additive or additive mixture can, firstly, retard hydrate even if the thermodynamic conditions in the medium are such that hydrates can form, and secondly, it can control the growth and agglomeration of crystals once they start to form in the conduit. It can be seen that inhibiting growth and dispersion leads to the slow formation of small crystals which remain dispersed in the fluid. In contrast, when adding a kinetic inhibitor which essentially affects hydrate formation, it can be seen that the hydrates grow explosively as soon as the inhibitor becomes ineffective due to too large a drop in temperature—exceeding the maximum undercooling tolerated by the additive—or by too long a sojourn of the fluid in the zone in which hydrates can form—typically during an extended production stoppage.

When the process is applied to drilling operations, the additive or additive mixture can be added to the mud via the mud tanks at the well head.

In a second implementation, the present invention provides a process for retarding the formation of hydrates and for reducing their growth rate and tendency to agglomerate in a fluid comprising at least water and hydrocarbons which can form hydrates, under temperature and pressure conditions in which hydrates can form, characterized in that the following is incorporated into said fluid:

a mixture of additives comprising
at least one compound containing at least one sequence of at least two alkylene oxide moieties in the form of a macromer, a polymerizable unit containing an alkylene polyoxide as a side chain, as defined above; and at least one kinetic inhibitor of hydrates;

or an additive comprising at least one copolymer formed between at least one macromer as defined above and at least one kinetic additive type structure.

In a first variation of this implementation of the process of the invention, the combined effect of the kinetic inhibitor+ specific growth and/or agglomeration inhibitor can firstly be obtained by means of a formulation which comprises, combined with compounds containing at least one sequence of at least two alkylene oxide moieties in the form of a macromer, a polymerizable unit comprising an alkylene polyoxide as a side chain as indicated above, with homopolymers of kinetic type macromers or copolymers comprising only kinetic type macromers or natural polymers having a kinetic effect, or surfactants.

As described above, the specific growth and/or agglomeration inhibitor(s) is (are) selected from macromers defined by general formula (A), polymers containing macromers defined in (A) either in the form of homopolymers, i.e., sequences of a single macromer moiety, or in the form of copolymers, i.e., polymers constituted by at least two different units, both defined by formula (A) and which differ in the side groups R2 bonded to the oxyalkylene groups, and/or in the groups R1 bonded to the macromolecular backbone and/or in the number of (CH$_2$-CHOR$_2$) sequences present in the macromer. These macromers and polymers described in the invention have mass average molecular masses which vary between 160 g.mor$^{-1}$ and several million, preferably from 250 g.mor$^{-1}$ to several million.

The kinetic inhibitors of hydrates can be homopolymers or copolymers formed from kinetic inhibitor monomers acting on the nucleation process and possibly on the growth of hydrates and, for example, selected from:

N-vinyl-2-lactame with a lactame ring containing 5 to 7 atoms, the lactame rings also optionally being modified by alkyl chains, for example N-vinyl-2-pyrrolidone or N-vinyl-2-caprolactame;

sodium acrylate, sodium methacrylate or acrylate or methacrylate esters containing organic groups optionally containing heteroatoms and optionally being positively or negatively charged, or containing both positive and negative charges;

acrylamide or methacrylamide, or acrylamide or methacrylamide N- or N,N-substituted by linear or cyclic organic groups optionally containing heteroatoms and optionally being positively or negatively charged, or containing both positive and negative charges;

N-vinyl acetamide or N-alkyl vinyl acetamide;

a vinyl carboxylate; and an N-acyl polyallylene imine, such as 2-ethyl-2-oxazoline.

The polymers may comprise one or more monomers from those described above. For copolymers, the monomers considered will be at least two in number and will be incorporated into the copolymer in proportions of 1% to 99% molar depending on the nature of the monomers and their reactivity relative to each other. Non limiting examples are copolymers such as N-vinyl-2-pyrrolidone/N-vinyl-caprolactame (NVP/NVCap), NVP/NVCap/dialkylacrylate, or acrylamide/acrylamido dimethyl propane sulphonate (AA/AMPS).

These mixtures are generally added to the fluid to be treated in concentrations of 0.05% to 5%, preferably 0.1% to 2% by weight, with respect to the amount of water in the medium. The respective proportions of the kinetic type additive with respect to the growth and/or agglomeration inhibiting additive can be from 5% to 80% and from 20% to 95% by weight, preferably 20% to 60% and 40% to 80% by weight respectively.

Natural polymers, also surfactants and amino acid derivatives having an effect on the hydrate formation kinetics can be added to the list of kinetic type homopolymers and copolymers cited above:

natural polysaccharides such as hydroxy ethyl cellulose (HEC) and other cellulose derivatives, carrageens, guar, agar, gum arabic, carob, xanthane, alginates and propylene glycol alginates, etc.;

surfactants composed of a hydrophobic portion derived from an alcohol, a fatty acid, alkylated phenol derivatives, polyolefins or long alkyl chains, and a polar head which may be:
anionic, of an alcoholate, sulphate, sulphonate, phosphate, phosphonate or phosphonic acid type;
cationic, of an ammonium, phosphonium or sulphonium type;
or neutral; and amino acid derivatives, for example tyrosine derivatives.

In a second variation of this implementation of the process of the invention, the two types of kinetic inhibitor additive and growth and/or agglomeration inhibitor additive defined by the structures described above can be united in a single copolymer. In this copolymer, one (or more) kinetic type monomer(s) can be combined with one (or more) growth and/or agglomeration inhibiting monomer(s). The resulting copolymers have mass average molecular masses in the range 1000 to 10$_6$ and are essentially water-soluble.

In these copolymers exhibiting both structures retarding the growth and/or agglomeration of hydrates and kinetic inhibiting structures, the structures retarding the growth and/or agglomeration of hydrates are macromers containing both a polyoxyalkylene glycol sequence, generally as defined by the general formula (A) given above, and the kinetic inhibitor monomers which act on the nucleation process and possibly on hydrate growth, can be selected from those described above.

The copolymers under consideration are preferably defined by the following general formula (B):

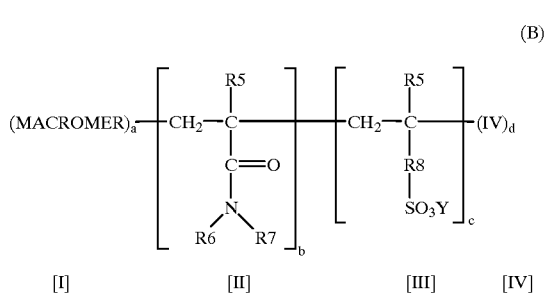

(B)

[I]  [II]  [III]  [IV]

where the entity MACROMER represents at least one macromer unit defined by general formula (A), R5 is a hydrogen atom or a methyl group, R6 is a hydrogen atom or an alkyl, cycloalkyl, aryl or alkylaryl type hydrocarbon group containing 1 to 30 carbon atoms, R7 is a hydrogen atom or an alkyl, cycloalkyl, aryl or alkylaryl type hydrocarbon group containing 1 to 30 carbon atoms, where R6 and R7 may be identical or different; R8 is selected from a single bond, divalent $CH_2$ groups and divalent—$C_6H_4$—and—$CONHC(CH_3)_2$—$CH_2$— groups, and Y is a hydrogen atom, an alkali metal atom or an ammonium group. The monomer (IV) is selected from kinetic structures described above and is such that it is different from monomers [I], [II] and [III].

The formula of copolymer (B) is such that the sum a+b+c+d=1, where a is in the range 0.01 to 1 and b, c and d are each in the range 0 and 0.99.

Adding a mixture of several copolymers defined by general formula (B) can be envisaged in order to obtain the best performances possible and to adapt the additive to the fluid to be treated.

The copolymers(s) defined by formula (B) is (are) added to the fluid to be treated in concentrations which can be from 0.05% to 5%, preferably in the range 0.1% to 2% by weight with respect to the amount of water in the medium.

Further, it is also possible in this case to add, to the copolymers comprising both structures retarding the growth and/or agglomeration of hydrates and kinetic inhibiting structures, mixtures of kinetic type homopolymers and copolymers cited above, natural polymers and/or surfactants having an effect on the hydrate formation kinetics, such as those already mentioned above, also amino acid derivatives, such as tyrosine derivatives.

In all cases, the additive(s) of the invention can be mixed with one or more alcohols (monoalcohols or polyalcohols) containing 1 to 6 carbon atoms, for example, more particularly mono-, di- or tri-ethylene glycol, ethanol or methanol, the latter being preferred. This alcohol (or alcohols) is (are) generally added in proportions of 0.5% to 20% by weight, preferably 1% to 10% by weight, with respect to the water present in the fluid to be treated. The additive (or additive mixture) considered in the invention can thus first be dissolved in a hydro-alcoholic medium and then added to the medium to be treated, to obtain final concentrations of additives which are generally 0.05% to 5% by weight, preferably 0.1% to 2% by weight, with respect to the water present in the fluid to be treated.

The essentially water-soluble additives or mixture of additives considered in the invention can be used either in a pure water medium, for example in water of condensation, or in a saline medium, for example in production water, or in seawater or in brine.

The complete description of all applications patents and publications cited above and below and corresponding French applications 97/10118 and 97/10119, filed on 05/08/97, are included in the present description by reference.

The invention will be better understood from the description of the following non limiting experiments. Examples 4, 5, 10 and 11 are given by way of comparison and do not form part of the invention.

EXAMPLE 1

The experimental procedure for selecting the additives was carried out using tetrahydrofuran (THE) hydrates. A pure water/THF solution (80/20 by weight) forms hydrates at atmospheric pressure at 4° C. (see "*Kinetic Inhibitors of Natural Gas Hydrates*", Sloan, E. D. et al., 1994).

The apparatus used was constituted by 16 mm diameter tubes into which 8 ml of an aqueous 20% by weight THF solution possibly containing the additive to be tested was introduced. An 8 mm diameter glass bead was introduced into each tube to ensure proper mixing of the solution. The tubes were placed in a rotary stirrer which rotated at 20 rpm. The stirrer was placed in a refrigerated chamber at 2° C.

The principle of these test was to determine the time Δt required to form a given quantity of hydrates. This time Δt corresponded to the interval measured between the moment when hydrate formation was observed (appearance of cloudiness) and the moment when a 1 cm thick hydrate plug formed in the tube.

Each series of tests was carried out in the presence of a reference mixture containing no additive, and the Δt recorded for an additive corresponded to an average time over 16 tests.

Under the above operating conditions, pure water/THF solutions had an average Δt of 17.0 minutes.

Under the operating conditions used, adding 0.5% by weight of polyethylene glycol monomethacrylate containing 6 ethylene glycol sequences, termed M in the remainder of the text, substantially slowed the rate of growth of THF hydrate crystals. The average Δt increased from 17 minutes for water to 21.4 minutes in the presence of additive.

Two homopolymers with different mass average molecular masses were synthesized from this macromer M by aqueous phase radical polymerization. These polymers were respectively designated homopolymer A and homopolymer B and respectively contained an average of 45 macromer units and 100 macromer units. The addition of 0.5% of homopolymer A to the medium extended Δt to 30.7 minutes, while the average Δt produced when 0.5% of homopolymer B was added was 25.4 minutes.

Macromer M was also copolymerized with a polypropylene glycol monoacrylate type macromer containing 3 propylene glycol sequences as a side chain. The copolymer C obtained contained an average of 25 macromer units in proportions of 75/25 (respectively of macromer M and propylene glycol monoacrylate macromer). Under the test conditions, the average Δt determined for copolymer C was 31.2 minutes.

EXAMPLE 2

The experimental procedure of Example 1 was repeated, replacing the pure water with a mixture of pure water+5% by weight of methanol and reducing the temperature of the refrigerated chamber to−1° C.

Under these conditions, the average Δt of pure water+5% methanoI/THF solutions in the absence of additive was 23.0 minutes.

Adding 0.5% by weight of macromer M extended the average Δt to 26.3 minutes.

EXAMPLE 3

The experimental procedure of Example 1 was repeated, replacing the pure water with a 3.5% by weight NaCl solution, and the temperature of the refrigerated chamber was reduced to -1° C. Under these conditions, the average Δt of NaCl/THF solutions in the absence of additive was 22.3 minutes.

The average Δt values determined respectively for macromer M, homopolymer A and copolymer C were respectively 27.1 minutes, 33.1 minutes and 29.8 minutes.

EXAMPLE 4 (comparative)

Different additives which did not fall within the scope of the invention were tested for comparison purposes under the conditions described for Example 1:

Product D: Polyvinyl pyrrolidone (mass average molecular weight: 1.5 million);

Product E: Polyacrylamide (mass average molecular weight: 1.0 million);

Product F: 40/60 acrylamide/acrylic acid copolymer (mass average molecular weight: 1.0 million);

Product G: GAFFIX VC-713 (N-vinyl-2-pyrrolidone/N-vinyl-ε-caprolactam/dimethylaminoethyl methacrylate);

Product H: 55/45 acrylic acid/butyl acrylate copolymer (mass average molecular weight: 8.0 million; 0.5% by weight).

Under the test conditions used, the Δts of these additives were substantially shorter than those of the substances of the invention, as the results shown in the table below demonstrate.

EXAMPLE 5 (comparative)

Product H, not within the scope of the invention, was tested for comparison purposes under the conditions described in Example 3.

Under the test conditions used, the Δt of this additive was much shorter than those of the substances of the invention, as the results shown in Table 1 below demonstrate.

TABLE 1

| Additive (mole % of units) | Concentration (weight %) | Operating conditions | Δt (min) |
|---|---|---|---|
| Ex. 1: | | | |
| no additive | — | pure water/THF at 2° C. | 17.0 |
| Macromer M | 0.5 | pure water/THF at 2° C. | 21.4 |
| Homopolymer A | 0.5 | pure water/THF at 2° C. | 30.7 |
| Homopolymer B | 0.5 | pure water/THF at 2° C. | 25.4 |
| Copolymer C | 0.5 | pure water/THF at 2° C. | 31.2 |
| Ex. 2: | | | |
| No additive | — | water + 5% MeOH/THF at −1° C. | 23.0 |
| Macromer M | 0.5 | water + 5% MeOH/THF at −1° C. | 26.3 |
| Ex. 3: | | | |
| No additive | — | 3.5% NaCl/THF at −1° C. | 22.3 |
| Macromer M | 0.5 | 3.5% NaCl/THF at −1° C. | 27.1 |
| Homopolymer A | 0.5 | 3.5% NaCl/THF at −1° C. | 33.1 |
| Copolymer C | 0.5 | 3.5% NaCl/THF at −1° C. | 29.8 |
| Ex. 4: | | | |
| No additive | — | pure water/THF at 2° C. | 17.0 |
| Product D: | 0.5 | pure water/THF at 2° C. | 19.0 |
| Product E: | 0.5 | pure water/THF at 2° C. | 17.1 |
| Product F: | 0.5 | pure water/THF at 2° C. | 7.7 |
| Product G | 0.5 | pure water/THF at 2° C. | 12.9 |
| | 0.3 | pure water/THF at 2° C. | 12.9 |
| Product H: | 0.5 | pure water/THF at 2° C. | 13.1 |
| Ex. 5: | | | |
| No additive | — | 3.5% NaCl/THF at −1° C. | 22.3 |
| Product H: | 0.3 | 3.5% NaCl/THF at −1° C. | 20.4 |

EXAMPLE 6

In order to test the effectiveness of the products used in the process of the invention in the presence of methane hydrates, tests for forming hydrates from gas and water were carried out using the apparatus described below.

The apparatus comprised a 10 meter loop constituted by 7.7 mm diameter tubes, a 2 liter reactor comprising an inlet and an outlet for gas, and an intake and a discharge for the water and additive initially introduced. The reactor enabled the loop to be pressurised. Tubes with an analogous diameter to those of the loop allowed the fluid to circulate from the loop to the reactor and vice versa, by means of a gear pump placed between the two. A sapphire cell integrated into the circuit enabled the circulating liquid to be observed as well as the hydrates when they formed.

In order to determine the effectiveness of the additives of the invention, the fluid (water+additive) was introduced into the reactor. The apparatus was then pressurised to 7 MPa. The solution was homogenised by circulating it in the loop and reactor for one hour at 20° C. The pressure was kept constant by adding methane, and the temperature was gradually reduced (0.5° C./min) from 20° C. to 3° C., corresponding to the selected experimental temperature.

The principle of these tests was to determine the temperature at which the methane hydrates were formed in the loop and to evaluate the rate of growth and the quantity of hydrate crystals formed. Hydrate formation was detected by a release of heat and an increase in gas consumption.

In the absence of additive (medium: deionized water), the methane hydrates formed at a temperature close to 10.8° C. From the formation of the first crystals, two phases were observed regarding gas consumption. In the first phase (about 5 minutes), gas addition was very small then, in the second phase it became extremely high (flow meter open to maximum) until complete blockage of the fluid+hydrates mixture circulation in the loop+reactor ensemble. The second phase, corresponding to crystal growth and agglomeration, lasted 28 minutes and the total consumption was an average of 17 normal liters.

The addition of 0.5% by weight of macromer M with respect to the water slightly reduced the temperature at which the methane hydrates were formed (10.3° C.), under the pressure and temperature conditions of this test, and the gas consumption here too was in two phases. The first phase was analogous to that observed in pure water, the second phase, representing crystal growth, occurred over an average time of 50 minutes, and the flow meter was open to about 50% of its maximum capacity. As a result, to arrive at a quasi identical total consumption of 17 normal liters, about twice as long was required because crystal growth had been slowed down.

EXAMPLE 7

The experimental procedure of Example 1 was repeated to determine:

firstly, the latency period (lp) preceding hydrate formation. This latency period corresponded to the interval between the moment when the tubes were introduced into the refrigerated chamber and the moment when hydrate formation was observed (appearance of cloudiness);

secondly, the time Δt required to form a given quantity of hydrates. This time Δt corresponded to the interval between the moment when hydrate formation was observed (appearance of cloudiness) and the moment when a 1 cm thick hydrate plug formed in the tube.

The test lasted 6 hours. Since the hydrates had not formed in the majority of the tests (preponderant kinetic effect), the concentration of additive was reduced to enable the average Δt values to be determined.

Each series of tests was carried out in the presence of a reference mixture containing no additive, and the values of lp and Δt recorded for each additive corresponded to an average time over 16 tests.

Under the operating conditions described above, pure water/THF solutions had an average latency period of 35 minutes and an average Δt of 17.0 minutes.

Two copolymers comprising kinetic structures and growth and/or agglomeration inhibiting structures were synthesized. The first—copolymer A—with mass average 150000 contained vinyl pyrrolidone monomer units and polyethylene glycol monomethacrylate tpe macromer units containing 6 ethylene glycol sequences, termed macromer M in the remainder of the text. The second copolymer—copolymer B—was obtained by polymerizing macromer M with acrylamide and acrylamido methyl propane sulphonate (AMPS). The combination of these two types of structure in a single macromolecule enabled the latency period to be considerably extended, increasing to 165 and 264 minutes respectively for copolymers A and B, and substantially slowed the rate of growth and/or agglomeration of THF hydrate crystals, since the average Δt values increased from 17 minutes for water to 28.4 and 24.0 minutes for copolymers A and B.

In the same manner, the mixture of kinetic additive and growth and/or agglomeration inhibitor produced both an increase in the latency period and a slowdown in the rate of formation of the hydrate plug.

A copolymer C, obtained by polymerizing macromer M and a polypropylene glycol monoacrylate type macromer containing 3 propylene glycol sequences as a side chain and containing an average 25 macromer units in proportions of 75/25 of macromer M and propylene glycol monoacrylate macromer respectively, was mixed with a sample of poly-N-vinyl-pyrrolidone cited in Example 4 (Product D) in proportions of 50:50 by weight. Adding 0.5% by weight of this mixture with respect to the water extended the latency period to 146 minutes and the average blockage time to 22.0 minutes.

A second mixture was composed of 50% by weight of homopolymer A defined in Example 1 (containing an average 45 macromer units) and 50% by weight of GAFFIX VC-713 (defined above in Example 4: Product G). Adding 0.5% by weight of this mixture to the medium multiplied the latency period by 6.8 and extended the average Δt by more than 13 minutes.

EXAMPLE 8

The experimental procedure of Example 7 was repeated, replacing pure water with a mixture of pure water+5% by weight of methanol and reducing the temperature of the refrigerated chamber to−1° C.

Under these conditions, the average latency period of pure water+5% methanol/THF solutions in the absence of additive was 29 minutes and the average Δt was 23.0 minutes.

Adding 0.5% by weight of copolymer A as defined above with respect to the amount of water in the medium multiplied the average latency period by 6.5 and the average Δt was 33.5 minutes.

EXAMPLE 9

The experimental procedure of Example 7 was repeated, replacing the pure water with a 3.5% by weight NaCl solution, and the temperature of the refrigerated chamber was reduced to−1° C. Under these conditions, the average latency period of NaCl/THF solutions in the absence of additive was 37 minutes and the average Δt of NaCl/THF solutions in the absence of additive was 22.3 minutes.

Adding 0.5% by weight of copolymer B, described in Example 7, with respect to the amount of water in the medium totally inhibited hydrate formation. When the amount of copolymer B in the medium was reduced to 0.3% by weight with respect to the amount of water, the average latency period was multiplied by more than 4 and the average Δt was extended by practically 10 minutes.

The homopolymer A+GAFFIX VC-713 (50/50) mixture added in an amount of 0.5% by weight produced an average latency period of 190 minutes and an average Δt of 25.8 minutes. Finally, the mixture of homopolymer A and acrylamide/AMPS copolymer (88/12) with molecular mass $2 \times 10_6$ in 50/50 proportions totally inhibited hydrate formation for 6 hours in an amount of 0.5% by weight. Used in an amount of 0.3% by weight, this mixture multiplied the latency period by about 5 and the average Δt was 26.8 minutes.

EXAMPLE 10 (comparative)

This example repeated the results obtained (Δt) when using products D to H defined in Example 4, in the concentrations shown in Table 2 below.

Under the test conditions used (analogous to those of Example 7), these additives had much shorter Δt values than those of the substances of the invention, as the results shown in Table 2 below demonstrate. The latency period (lp) as defined in Example 7 is also shown for each of products D to H at the concentration indicated.

EXAMPLE 11 (comparative)

Product H, not within the scope of the invention, was tested for comparison purposes under the conditions described in Example 9.

Under the test conditions used, this additive had a much shorter Δt than those of the substances of the invention, as the results shown in Table 2 below demonstrate. The latency period (lp) defined as in Example 7 is also shown.

TABLE 2

| Additive (mole % of units) | Concentration (weight %) | Operating conditions | Latency period (min) | Δt (min) |
|---|---|---|---|---|
| Ex. 7: | | | | |
| no additive | — | pure water/THF at 2° C. | 35 | 17.0 |
| Copolymer A | 0.5 | pure water/THF at 2° C. | 165 | 28.4 |
| Copolymer B | 0.5 | pure water/THF at 2° C. | 264 | 24.0 |
| Copolymer C + PVP | 0.5 | pure water/THF at 2° C. | 146 | 22.0 |
| Homopolymer A + VC-713 | 0.5 | pure water/THF at 2° C. | 240 | 30.7 |
| Ex. 8: | | | | |
| No additive | — | water + 5% MeOH/THF at −1° C. | 29 | 23.0 |
| Copolymer A | 0.5 | water + 5% MeOH/THF at −1° C. | 191 | 33.5 |
| Ex. 9: | | | | |
| No additive | — | 3.5% NaCl/THF at −1° C. | 37 | 22.3 |
| Copolymer B | 0.5 | 3.5% NaCl/THF at −1° C. | >360 | n.d.* |

TABLE 2-continued

| Additive (mole % of units) | Concentration (weight %) | Operating conditions | Latency period (min) | Δt (min) |
|---|---|---|---|---|
| | 0.3 | 3.5% NaCl/THF at −1° C. | 153 | 31.7 |
| Homopolymer A + VC-713 | 0.5 | 3.5% NaCl/THF at −1° C. | 190 | 25.8 |
| Homopolymer A + AA/AMPS | 0.5 | 3.5% NaCl/THF at −1° C. | >360 | n.d.* |
| | 0.3 | 3.5% NaCl/THF at −1° C. | 188 | 26.8 |
| Ex. 10: | | | | |
| No additive | — | pure water/THF at 2° C. | 35 | 17.0 |
| Product D: | 0.5 | pure water/THF at 2° C. | 135 | 19.0 |
| Product E: | 0.5 | pure water/THF at 2° C. | 100 | 17.1 |
| Product F: | 0.5 | pure water/THF at 2° C. | 136 | 7.7 |
| Product G | 0.3 | pure water/THF at 2° C. | 150 | 12.9 |
| Product H: | 0.5 | pure water/THF at 2° C. | 90 | 13.1 |
| Ex. 11: | | | | |
| No additive | — | 3.5% NaCl/THF at −1° C. | 37 | 22.3 |
| Product H: | 0.5 | | 57 | 20.4 |

*n.d.: could not be determined.

EXAMPLE 12

The procedure of Example 6 was repeated.

Adding 0.5% by weight of copolymer B—as described in Example 7, with respect to the water, substantially reduced the temperature at which methane hydrates were formed: ft (formation temperature)=5.1° C.

Under the pressure and temperature conditions of this test, the gas consumption was also in two phases. Because of the substantial reduction in the hydrate formation temperature in this case, the first consumption phase was different as regards time; further, the second phase up to blockage was considerably extended (it lasted about 2 hours, instead of 28 minutes for pure water) for a quasi identical total gas consumption of 17 normal liters.

Using copolymer B combined the effects of retarding crystal formation and slowing their growth and/or agglomeration.

The above examples could be repeated with analogous results by substituting the general or particular reactants and/or conditions described in the invention for those used in the examples.

In view of the preceding description, the skilled person can readily determine the essential characteristics of the invention and can make various changes or modifications to adapt it to various uses and implementation conditions, without departing from the spirit and scope of the invention.

What is claimed is:

1. A process for slowing the growth and/or agglomeration and optionally for retarding the formation of hydrates in a fluid comprising water and a gas, under conditions in which hydrates can form from the water and gas, comprising incorporating into the fluid a growth and/or agglomeration inhibiting additive containing at least one essentially water-soluble polyoxyalkylene glycol macromer, or a homopolymer or copolymer thereof.

2. A process according to claim 1, wherein said polyoxyalkylene glycol macromer has the formula:

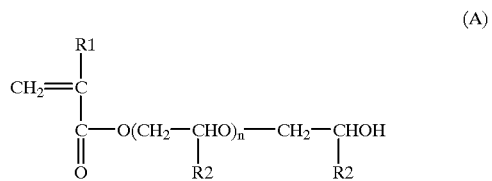

(A)

where R1 represents a hydrogen or an alkyl group containing 1 to 6 carbon atoms; R2 represents a hydrogen atom or an alkyl group; and n represents the degree of polymerization and has a value of 1 to 140.

3. A process according to claim 2, wherein in formula (A), the value of the degree of polymerization n is 3 to 140.

4. A process according to claim 1, wherein said macromer, homopolymer or copolymer has a mass average molecular mass of at least 160 g.mol$^{-1}$.

5. A process according to claim 4, wherein said mass average molecular mass is at least 250 g.mol$^{-1}$.

6. A process according to claims 1, wherein said macromer, homopolymer or copolymer is added to the fluid to be treated in a concentration of 0.05% to 5% with respect to water present.

7. A process according to claim 6, wherein the concentration of macromer, homopolymer or copolymer is 0.1% to 2% by weight with respect to water present.

8. A process according to claim 1, further comprising adding at least one kinetic inhibitor of hydrates into said fluid thereby supplying an additive mixture of the growth and/or agglomeration inhibiting additive and kinetic inhibitor into said fluid.

9. A process according to claim 8, wherein said kinetic inhibitor compound is a homo- or copolymer formed from at least one monomer compound which is:

N-vinyl-2-lactam with a lactam ring containing 5 to 7 atoms, optionally modified by at least one alkyl chain;

sodium acrylate, sodium methacrylate, acrylate esters or methacrylate esters, said esters containing organic groups optionally containing heteroatoms and optionally being positively or negatively charged, or containing both positive and negative charges;

acrylamide or methacrylamide, or acrylamide, each N- or N,N-substituted by linear or cyclic organic groups each optionally containing heteroatoms and optionally being positively or negatively charged, or containing both positive and negative charges;

N-vinyl acetamide or N-alkyl vinyl acetamide;

a vinyl carboxylate; or an N-acyl polyalkylene imine.

10. A process according to claim 8, wherein the kinetic inhibitor comprises at least one compound which is a natural polymer, a surfactant or an amino acid, having an effect on the kinetics of hydrate formation.

11. A process according to claim 10, wherein:

said natural polymer is at least one natural polysaccharide;

said surfactant contains a hydrophobic portion from an alcohol, a fatty acid, an alkylated phenol, a polyolefin, or an alkyl moiety and a polar head which may be:

anionic, of an alcoholate, sulphate, sulphonate, phosphonate or phosphonic acid moiety;

cationic, of an ammonium, phosphoniumn or sulphonium moiety;
or neutral; and
said amino acid contains a tyrosine moiety.

12. A process according to claim 11, wherein the natural polymer is a cellulose.

13. A process according to claim 11, wherein the natural polymer is hydroxylethyl cellulose, carrageenan, guar, agar, gum arbic, carob, xanthan, an alginate or propylene glycol alginate.

14. A process according to claim 8, wherein the additive mixture is added to the fluid to be treated in a concentration of 0.05% to 5% by weight with respect to the amount of water in the fluid.

15. A process according to claim 8, wherein the respective proportions of the kinetic inhibitor and the growth and/or agglomeration inhibiting additive are 5% to 80% and 20% to 95% by weight.

16. A process according to claim 1, comprising retarding the formation of hydrates and slowing their rate of growth and/or agglomeration, by adding at least one additive comprising at least one copolymer formed between at least one polyoxyalkylene glycol macromer and at least one kinetic inhibitor into said fluid.

17. A process according to claim 16, wherein said macromer has formula (A):

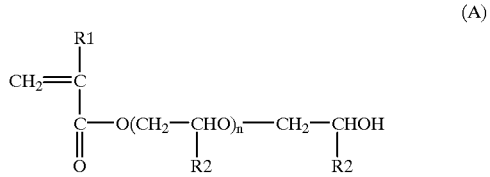

(A)

where R1 represents a hydrogen or an alkyl group containing 1 to 6 carbon atoms; R2 represents a hydrogen atom or an alkyl group; and n represents the degree of polymerization and has a value in the range 1 to 140.

18. A process according to claim 17, wherein the degree of polymerization n is 3 to 140.

19. A process according to claim 17,
wherein said copolymer formed between at least one macromer and at least one kinetic additive has formula (B):

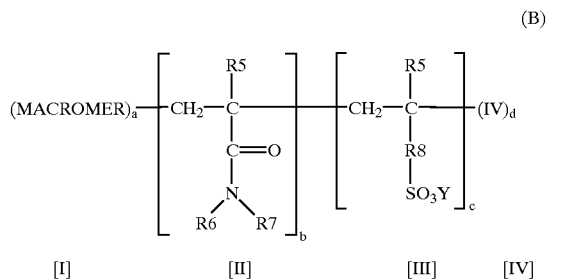

(B)

where the entity MACROMER represents one or more macromer units defined by general formula (A), R5 is a hydrogen atom or a methyl group, R6 is a hydrogen atom or an alkyl, cycloalkyl, aryl or alkylaryl hydrocarbon group containing 1 to 30 carbon atoms, R7 is a hydrogen atom or an alkyl, cycloalkyl, aryl or alkylaryl hydrocarbon group containing 1 to 30 carbon atoms, where R6 and R7 may be identical or different; R8 is a single bond, divalent $-CH_2-$ groups, divalent $-C_6H_4-$ groups or divalent $-CONHC(CH_3)_2-CH_2-$ groups, and Y is a hydrogen atom, an alkali metal atom or an ammonium group;

wherein monomer (IV) is
N-vinyl-2-lactam with a lactam ring containing 5 to 7 atoms, optionally modified by at least one alkyl chain;
sodium acrylate, sodium methacrylate, acrylate esters or methacrylate esters, said esters containing organic groups optionally containing heteroatoms and optionally being positively or negatively charged, or containing both positive and negative charges;
acrylamide or methacrylamide, or acrylamide , each N- or N,N-substituted by linear or cyclic organic groups each optionally containing heteroatoms and optionally being positively or negatively charged, or containing both positive and negative charges;
N-vinyl acetamide or N-alkyl vinyl acetamide;
a vinyl carboxylate; or
an N-acyl polyalkylene imine;
and such that it is different from monomers I, II and III; the formula of copolymer (B) being such that the sum $a+b+c+d=1$, where a is 0.01 to 1 and b, c, and d are each 0 to 0.99.

20. A process according to claim 16, wherein said kinetic inhibitors in the composition of said copolymer is at least one of:

N-vinyl-2-lactam with a lactam ring containing 5 to 7 atoms, optionally modified by at least one alkyl chain;
sodium acrylate, sodium methacrylate, acrylate esters or methacrylate esters, said esters containing organic groups optionally containing heteroatoms and optionally being positively or negatively charged, or containing both positive and negative charges;
acrylamide or methacrylamide, or acrylamide or methacrylamide each N- or N,N-substituted by linear or cyclic organic groups each optionally containing heteroatoms and possibly being positively or negatively charged, or containing both positive and negative charges;
N-vinyl acetamide or N-alkyl vinyl acetamide;
a vinyl carboxylate; or
an N-acyl polyalkylene imine.

21. A process according to claim 16, wherein said copolymer is added to the fluid to obtain a concentration of 0.05% to 5% by weight with respect to the amount of water in the fluid.

22. A process according to claim 16, wherein at least one natural polymer, surfactant or amino acid having an effect on hydrate formation is also incorporated.

23. A process according to claim 22, wherein:
said natural polymer is at least one natural polysaccharide
said surfactant contains a hydrophobic portion from an alcohol, a fatty acid, an alkylated phenol a polyolefin or an alkyl moiety, and a polar head which may be:
anionic, of an alcoholate, sulphate, sulphonate, phosphate, phosphonate or phosphonic acid moiety;
cationic, of an ammonium, phosphonium or sulphonium moiety;
or neutral; and the
amino acid contains a tyrosine moiety.

24. A process according to claim 23, wherein the natural polymer is a cellulose.

25. A process according to claim 23, wherein the natural polymer is hydroxylethyl cellulose, carrageenan, guar, agar, gum arbic, carob, xanthan, an alginate or propylene glycol alginate.

26. A process according to claim 1, further comprising adding at least one monoalcohol or polyol containing 1 to 6 carbon atoms to the fluid in a proportion of 0.5% to 20% by weight with respect to water present in the fluid.

27. A process according to claim 26, wherein said alcohol is mono-, di- or tri-ethylene glycol, ethanol or methanol.

28. A process according to claim 26, comprising first dissolving said additive in a hydro-alcoholic medium and adding said additive to the fluid to be treated, to obtain a final concentration of said additive of 0.05% to 5% by weight with respect to water present in the fluid to be treated.

* * * * *